United States Patent
Gotman et al.

(10) Patent No.: US 8,433,968 B2
(45) Date of Patent: Apr. 30, 2013

(54) METHOD AND SYSTEM FOR HARQ COMBINING IN A TELECOMMUNICATION SYSTEM

(75) Inventors: Maxim Gotman, Kfar Saba (IL); Assaf Touboul, Natanya (IL)

(73) Assignee: Qualcomm Incorporated, San Diego, CA (US)

( * ) Notice: Subject to any disclaimer, the term of this patent is extended or adjusted under 35 U.S.C. 154(b) by 491 days.

(21) Appl. No.: 12/728,310

(22) Filed: Mar. 22, 2010

(65) Prior Publication Data
US 2011/0231725 A1  Sep. 22, 2011

(51) Int. Cl.
*H03M 13/00* (2006.01)
(52) U.S. Cl.
USPC .......................................................... 714/751
(58) Field of Classification Search .................... 714/751
See application file for complete search history.

(56) References Cited

U.S. PATENT DOCUMENTS

| | | | |
|---|---|---|---|
| 2009/0100310 A1 | 4/2009 | Yoo et al. | |
| 2011/0066912 A1* | 3/2011 | Riess et al. | 714/751 |
| 2011/0173508 A1* | 7/2011 | Wehinger | 714/748 |
| 2011/0261868 A1* | 10/2011 | Bachl et al. | 375/224 |
| 2012/0069935 A1* | 3/2012 | Lee et al. | 375/320 |

FOREIGN PATENT DOCUMENTS

WO    2009015170 A1    1/2009

OTHER PUBLICATIONS

Naroska E et al: "A novel type-II hybrid ARQ scheme", Emerging Technologies: Frontiers of Mobile and Wireless Communication, 2004. Proceedings of the IEEE 6th Circuits and Systems Symposium, Piscataway, NJ, USA, IEEE, May 31, 2004, pp. 85-88, XP002464364, DOI: DOI: 10.1109/CASSET.2004.1322923 ISBN: 978-0-7803-7938-1.

* cited by examiner

*Primary Examiner* — M Mujtaba K Chaudry
*Assistant Examiner* — Enam Ahmed

(57) ABSTRACT

A receiver and method for HARQ combining of a received codeword in a receiver with a FEC decoder, the method including computing Log Likelihood Ratios (LLRs) of demodulated soft symbols of the received codeword and outputting the LLRs as a-priori soft bits; performing iterative decoding of the a-priori soft bits in a Forward Error Correction (FEC) decoder; outputting a posteriori soft bits of the a priori soft bits of the received codeword from the FEC decoder; and HARQ combining the a posteriori soft bits with a retransmission of the received codeword.

23 Claims, 4 Drawing Sheets

METHOD AND SYSTEM FOR HARQ COMBINING IN A TELECOMMUNICATION SYSTEM

FIELD OF THE INVENTION

The present invention relates to telecommunications systems, in general and, in particular, to a receiver implementing the Hybrid Automatic Repeat Request (HARQ) technique.

BACKGROUND OF THE INVENTION

HARQ is a key technique in next generation wireless systems that spans both MAC and PHY layers, and exploits time/frequency diversity and coding gain. In the HARQ scheme, incorrectly received coded data blocks are stored at the receiver rather than discarded, and when the retransmitted block is received, the two blocks are combined. While it is possible that when independently decoded, two given transmissions cannot be decoded error-free, it may happen that the combination of all the erroneously received transmissions gives enough information to correctly decode the block.

There are two main ways of re-combining in HARQ:
Chase combining: every retransmission contains the same information (data and parity bits) and contributes more signal power;
Incremental redundancy: every retransmission contains some different information than the previous one. At every retransmission the receiver gains knowledge of extra information.

Modern Forward Error Correction (FEC) decoders process probabilistic information in the form of Log-Likelihood Ratios (LLR), also known as soft bits. The LLR values are the logarithm of the ratio of the probability of a certain bit being a '1' to that of it being a '0', $\ln [p(1)/p(0)]$. When a soft bit (LLR) equals '0', which is ln(1), it is equivalent to no or little information about the bit, which is equally likely to be a '0' or a '1' (i.e., $p(1)=p(0)$). When a soft bit (LLR)$\rightarrow\infty$ (or strongest or full-scale positive number in a fixed point representation), it means the bit is more likely to be a '1', while an LLR$\rightarrow\infty$ (or strongest or full-scale negative number in a fixed point representation) means the bit is more likely to be a '0'. In practice, instead of infinity, the range is a fixed range. For example, an LLR value may be an integer between −128 and +127, which can be represented by 8 binary bits.

Traditionally, the incorrectly decoded retransmissions are stored and combined in the receiver in the form of Log-Likelihood Ratio (LLR) values derived from the input of the Forward Error Correction (FEC) decoder (so-called a-priori information). The FEC decoder essentially exploits the redundant information of the codeword to strengthen the input (a-priori) LLR values of the encoded bits until LLR values are reached from which each bit's value can be concluded.

FIG. 1 is a block diagram illustrating a prior art receiver having a HARQ combining module and a FEC decoder. Receiver 10 includes a demodulator 12 for demodulation of a carrier wave and for outputting soft symbols. During the demodulation process in demodulator 20, channel estimation is performed and, accordingly, channel correction is applied to the samples, so as to output improved samples. In addition, during channel estimation and correction, Carrier Frequency Offset (CFO) and Sampling Timing Offset (STO) are estimated and the received samples are corrected, accordingly, and output as soft symbols.

Receiver 10 further includes a LLR calculator and HARQ combining module 14, which is coupled to demodulator 12, for computing the LLR values (soft bits) of each soft symbol, and for combining the LLR values of the current transmission with LLR values of previous transmissions of unsuccessfully decoded code words. Receiver 10 further includes a HARQ memory 18, which is coupled to LLR calculator/HARQ combining module 14, for storing the a-priori LLR values from the LLR calculator/HARQ combining module 14. The LLR values of each transmission stored in HARQ memory 18 are input into LLR calculator/HARQ combining module 14 for combining with LLR values of the following retransmission of the un-decoded data. LLR calculator/HARQ combining module 14 is further coupled to a FEC decoder 16, for decoding the soft bits and for outputting decoded hard bits.

Recently, different schemes of turbo-equalization (TEq) and Parallel and Successive Interference Cancellation (PIC or SIC, respectively) became a baseline for advanced multi-stream and multi-user receivers. These techniques exploit the a-posteriori information available on the output of the FEC decoder to remodulate each interfering stream individually, then subtract it from the received signal, thus improving the signal-to-interference ratio of the other streams and enabling their decoding. This process is done iteratively, either in parallel on every stream (PIC) or stream-by-stream (SIC), until all the streams are decoded or a maximum number of allowed iterations is achieved (in which case a HARQ retransmission will be requested).

This a-posteriori information is commonly an improved version of the input LLR values enriched with additional (so called extrinsic) information, related to the probability of each decoded bit. However, this additional information is discarded and thus, the benefits of the additional performance gain brought by the FEC decoder are not exploited, especially not in the case of HARQ. In addition, in the vast majority of commercially available decoders, calculation of a-posterior soft bits is not required, hence not output. Usually one seeks only the decoded hard bits (the final output of the decoder) of the payload.

One of the drawbacks of HARQ is a decrease in link capacity, since several retransmissions of the same information occur at the expense of new information that otherwise could be transmitted. Accordingly, any improvement in HARQ performance will effectively lead to a decrease in the required number of retransmissions and, thus, to an increase of the link capacity and data rates.

SUMMARY OF THE INVENTION

The present invention relates to a wireless telecommunication system and method involving HARQ operation in the receiver. In particular, it relates to a method for decoding HARQ retransmissions using Chase combining or/and incremental redundancy, the method including producing improved LLR (a-posteriori soft-bits) values on the FEC decoder output for both payload and parity bits, storing these values in the receiver memory, and combining these values with the a-priori LLR values of the next retransmission on the FEC decoder input. The invention also relates to a receiver including a FEC decoder producing a-posteriori soft-bits for each codeword's payload and parity bits, an algorithm determining the quality of the a-posteriori information with respect to that of the a-priori information and choosing the better of the two, according to a metric of the quality, for storing in memory, and an HARQ decoder combining the newly received LLR values with the previously stored values.

Thus, there is provided according to the present invention, a method for HARQ combining of a received codeword in a receiver with a FEC decoder, the method including computing Log Likelihood Ratios (LLRs) of demodulated soft symbols of the received codeword and outputting the LLRs as a-priori soft bits; performing iterative decoding of the a-priori soft bits in a Forward Error Correction (FEC) decoder; outputting a posteriori soft bits of the a priori soft bits of the received codeword from the FEC decoder; and HARQ combining the a posteriori soft bits with a retransmission of the received codeword.

There is further provided, according to the invention, a method for HARQ combining received soft bits, the method including converting soft symbols received from a demodulator to a priori LLR values; decoding the LLR values in a FEC decoder and outputting a payload and a posteriori LLR values of the a priori LLR values; determining if the decoding process was successful; if the codeword was not decoded successfully, soft-remodulating the a posteriori LLR values to an a posteriori soft symbol; calculating and comparing a metric of quality of the a posteriori soft symbols and of the a priori soft symbols; and storing the LLR values of the soft symbol whose metric of quality is better in a HARQ memory for combining with soft symbols of a retransmission of the data.

According to one embodiment of the invention, the metric of quality is variances, the step of calculating includes calculating and comparing variances of the a posteriori soft symbols and the variances of the a priori soft symbols; and the step of storing includes storing the LLR values of the soft symbol having a better variance in a HARQ memory for combining with soft symbols of a retransmission of the data.

There is also provided, according to the invention, a receiver for a wireless telecommunication system, the receiver including an LLR computation and HARQ combining module for providing a priori soft bits; a FEC decoder coupled to the LLR computation and HARQ combining module for receiving the a priori soft bits and outputting a posteriori soft bits corresponding thereto; and a HARQ memory coupled to the FEC decoder for receiving and storing the a posteriori soft bits; the HARQ memory being coupled to the LLR and HARQ combining module for providing the a posteriori soft bits thereto.

Preferably, the receiver further includes a compare and select unit coupled between the output of the LLR and HARQ combining module and the HARQ memory and coupled between the output of the FEC decoder and the HARQ memory, for comparing and selecting either the a priori or the a posteriori soft bits, whichever are better, for storing in the HARQ memory.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to a method and system for wireless telecommunications providing improved performance of the HARQ technique. This is accomplished by exploiting the a-posteriori information from the FEC decoder for combination with the a-priori information of the next retransmission for incorrectly decoded code words.

The a-posteriori information from the FEC includes LLR (a-posteriori soft-bits) values after several iterations in the FEC decoder. Typically, this improves the LLR value and this improvement in the LLR values is a by-product of every modern SISO (soft-input soft-output) and some other FEC decoders. One example is the MAP, Maximum A-posteriori Probability decoder for CTC, Convolutional Turbo Code decoders, which is well known and widely used in the industry. According to HARQ techniques implemented in conventional receivers, only a-priori LLR values are stored, and these a-posteriori LLR values are discarded between the retransmissions. However, according to the present invention, if the a-posteriori LLR values include improved data (i.e., a reduced number of ambiguous bits), as compared to the a-priori LLR values, then the a-posteriori LLR values are stored in the receiver memory instead of the a-priori LLR values. These a-posteriori values are combined with the a-priori LLR values of the next retransmission of the incorrectly decoded code word on the FEC decoder input, thereby improving the probability of successful decoding, reducing the number of iterations carried out by the FEC decoder, and possibly, reducing the number of required retransmissions. It will be appreciated that storing the a-posteriori LLR values is carried out only in case the decoding process failed and a retransmission is required.

Figure 1:
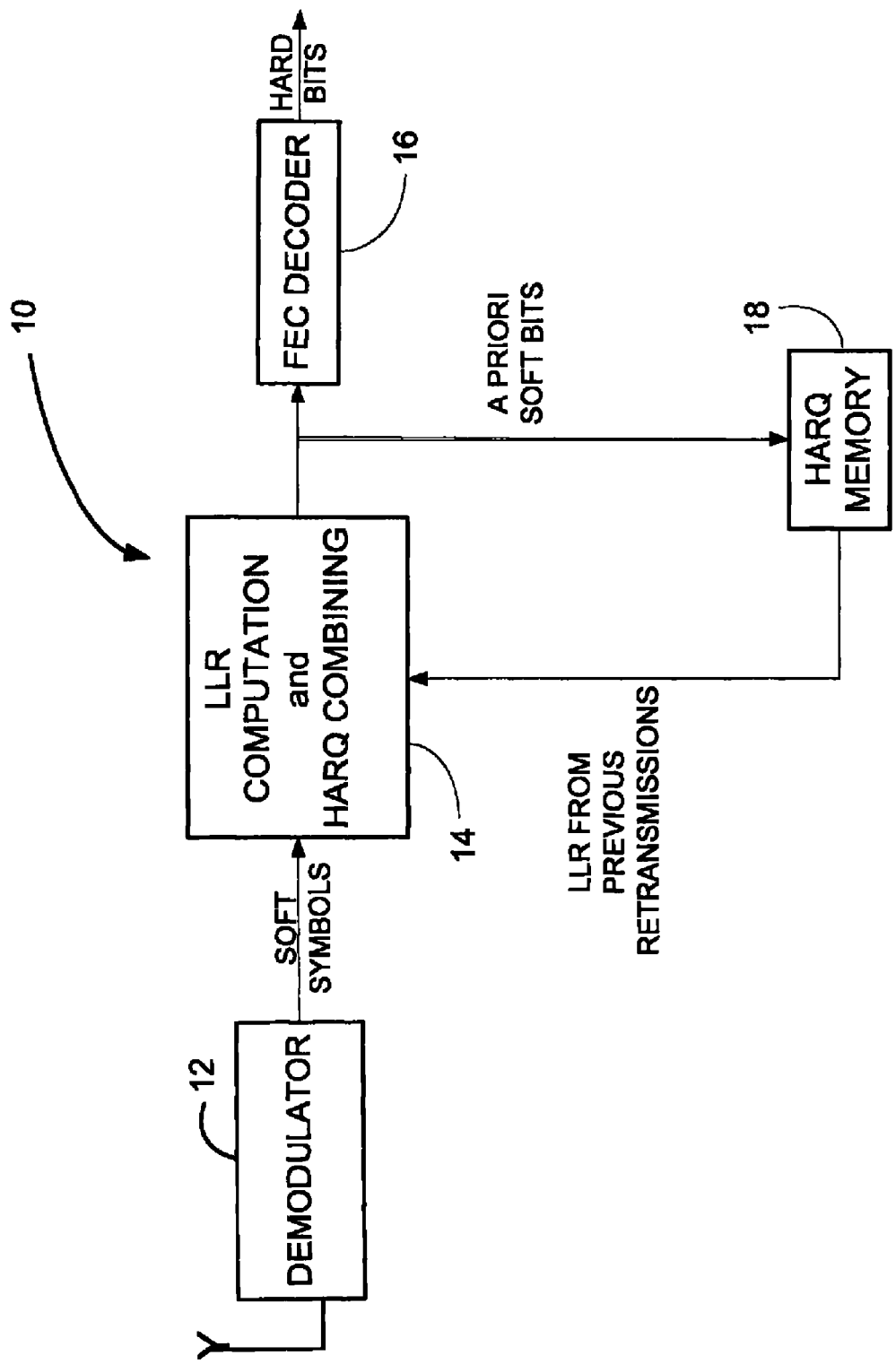
FIG. 1 is a block diagram illustration of a prior art HARQ receiver.
Figure 2A:
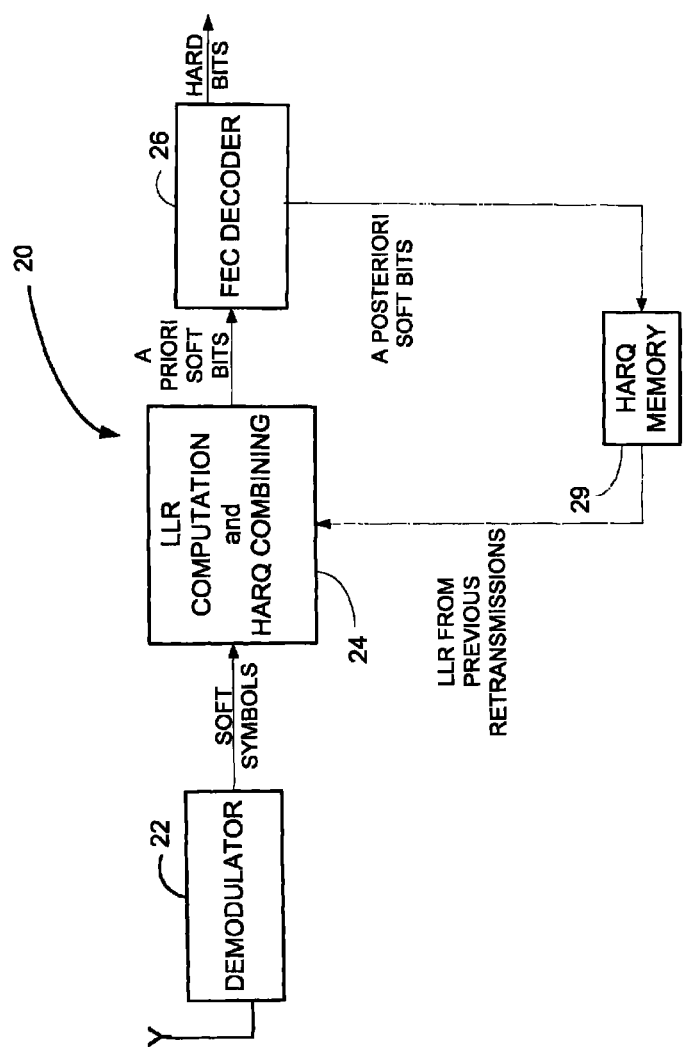
FIG. 2a is a block diagram illustration of a HARQ receiver constructed and operative according to one embodiment of the invention.
Figure 2B:
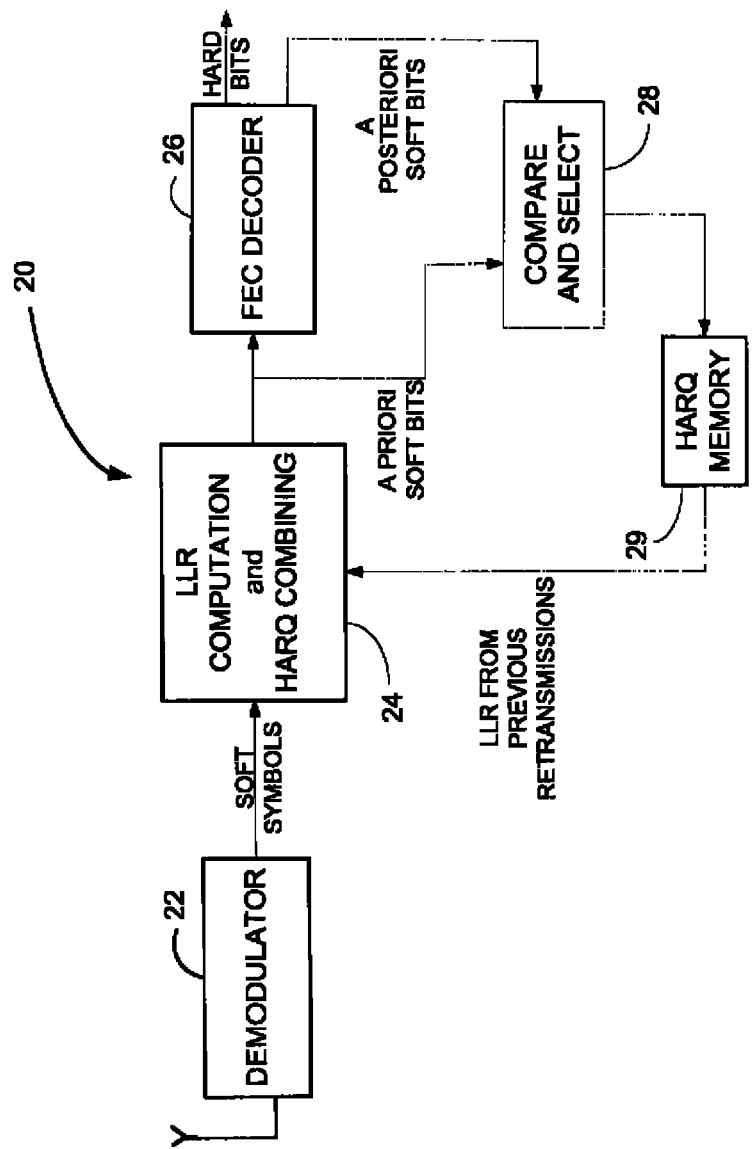
FIG. 2b is a block diagram illustration of a HARQ receiver constructed and operative according to another embodiment of the invention.

FIGS. 2A and 2B show block diagram illustrations of two different examples of a receiver 20 having a HARQ combining module constructed and operative in accordance with one embodiment of the present invention. In both FIG. 2A and FIG. 2B, receiver 20 includes a demodulator 22 for demodulation of a carrier wave and for outputting soft symbols. During the demodulation process in demodulator 22, channel estimation is performed and channel correction is applied to the samples. In addition to channel estimation and correction, Carrier Frequency Offset (CFO) and Sampling Timing Offset (STO) are estimated and the received samples are corrected, accordingly, and output as soft symbols.

Receiver 20 of FIGS. 2A and 2B further includes a LLR computation and HARQ combining module 24, which is coupled to demodulator 22, for computing the LLR values (soft bits) of each soft symbol, and for combining the LLR values of the current transmission with LLR values of previous transmissions, and rate matching of the whole block of LLRs to a mother code rate expected by the FEC decoder. Receiver 20 of FIGS. 2A and 2B further includes a FEC decoder 26 for decoding the soft bits and for outputting decoded hard bits. The decoding process exploits the redundant bits, each of which is a convolution function of the originally encoded bits of a transmitted codeword. Thus, the redundant bits are utilized for strengthening the a-priori LLR values input into FEC decoder 26 until each such LLR value is strong enough to permit the decoder to make a hard decision and conclude each bit's value. In case the decoding process was not successful, FEC decoder 26 yields a-posteriori LLR values for each codeword's payload and parity bits. Often, these a-posteriori LLR values have a higher absolute value than the absolute value of their a-priori LLR value, and thus, the a-posteriori LLR value may assist in the decoding process of the next retransmission.

In the example of FIG. 2A, these a-posteriori LLR values are output from FEC decoder 26 and stored in HARQ memory 29. HARQ memory 29 is further coupled to LLR calculator/HARQ combining module 24, for inputting the a-posteriori LLR values into the LLR calculator/HARQ combining module 24. The combined LLR values of all retransmissions of the same data stored in HARQ memory 29 are input into LLR calculator/HARQ combining module 24, where they are combined with LLR values of the following retransmission, to provide new a-posteriori LLR values which are stored in the HARQ memory 29. When each a-posteriori LLR value of the next retransmission is combined with the a-posteriori LLR value of previous transmissions, the decoding process is shortened. This is due to the fact that each a-posteriori LLR value was already processed by FEC decoder 26, and thus FEC decoder 26 may decode a 'hard decision' on the combined LLR values of the next retransmission with fewer iterations.

In the example of FIG. 2B, LLR calculator/HARQ combining module 24, and FEC decoder 26 are coupled to a compare and select unit 28, which is configured to receive the a priori soft bits from LLR calculator/HARQ combining module 24 and the a posteriori soft bits of the same bits from FEC decoder 26. Compare/select unit 28 includes an algorithm to determine the quality of the a-posteriori information as compared to that of the a-priori information for the same data and to choose the better of the two for storing in a memory, according to a pre-selected metric of quality of the data. According to one embodiment, the quality of the a-posteriori and the a-priori LLR values is determined by soft-remodulating the a-priori LLR values and comparing the variances of the a-priori and a-posteriori soft-symbols of the entire codeword (i.e., the average power of the soft symbols). The larger the variance, the closer the soft symbols vector is to the nominal constellation set of QAM symbols. Alternatively, the quality of the a-posteriori and the a-priori LLR values can be determined by comparing the average level of the absolute value of the a-priori LLR values and the a-posteriori LLR values of the entire received block. The higher this value, the higher the average confidence level of the soft bits.

Receiver 20 of FIG. 2B further includes a HARQ memory 29, coupled to compare and select unit 28, for storing the higher quality LLR values output by unit 28. HARQ memory 29 is further coupled to LLR calculator/HARQ combining module 24, for inputting these higher quality LLR values into the LLR calculator/HARQ combining module 24. The combined LLR values of all retransmissions of the same data stored in HARQ memory 29 are input into LLR calculator/HARQ combining module 24, where they are combined with LLR values of the following retransmission, to provide new LLR values which are stored in the HARQ memory. When each LLR value of the next retransmission is combined with the improved LLR value of previous transmissions, the decoding process is shortened. This is due to the fact that each improved LLR value was already processed by FEC decoder 26, and thus FEC decoder 26 may decode a 'hard decision' on the combined LLR values of the next retransmission with fewer iterations.

Thus, the receiver according to the present invention implements a novel scheme where the FEC decoder in the receiver has the ability to output improved soft-bits, a-posteriori LLRs, for an entire codeword (both payload and parity bits) in the process of iterative decoding of the codeword (introduced as a-priori LLRs on the decoder input). As stated above, the decoder enhances the a-priori information during its operation, usually iteratively, and increases the LLR values and, hence, the probabilities of the decoded bits to be either a '0' or a '1'.

Figure 3:
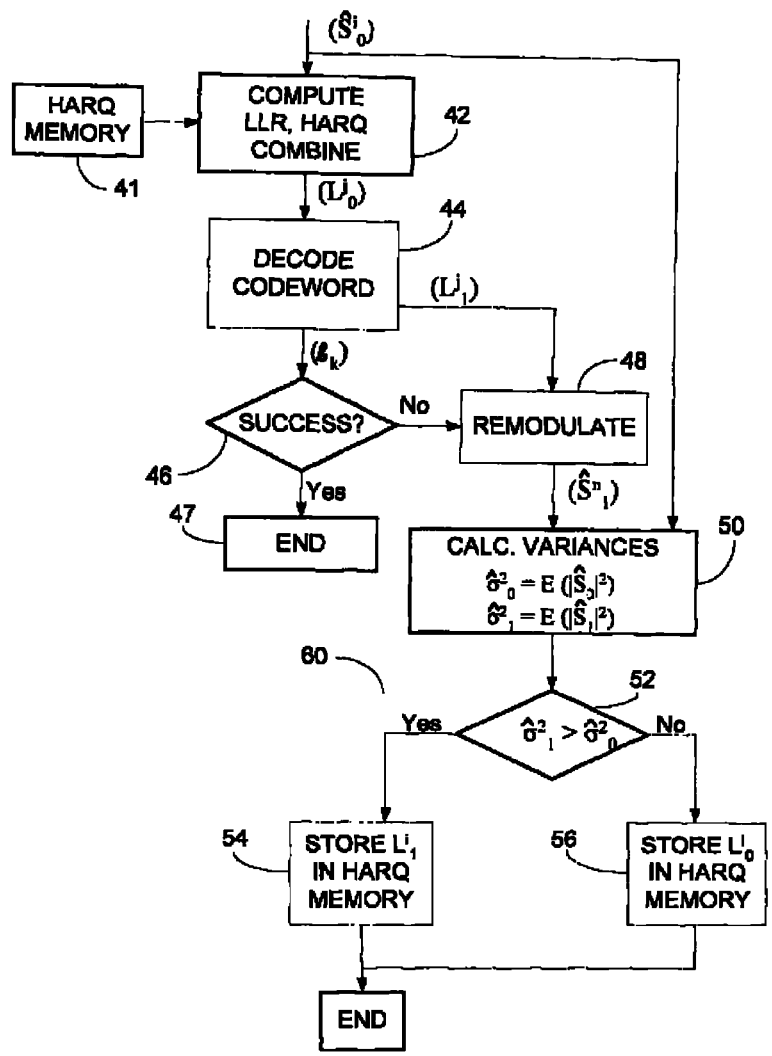
FIG. 3 is a flow chart of one method of operation of a HARQ receiver constructed and operative according to one embodiment of the invention.

Referring now to FIG. 3, there is shown a flow chart illustrating one method of operation of the HARQ combining module according to the present invention. Soft symbols received from a demodulator are converted to LLR values and combined with LLR values from previous transmissions of the same data (block 42) which were stored in a HARQ memory 41. The LLR values are then decoded (block 44) and a payload is output. A checksum algorithm, such as a cyclic redundancy check (CRC), determines if the decoding process was successful. If the codeword is decoded successfully (block 46) the process is terminated (block 47), and the bit stream is transferred to an application. However, if the codeword is not decoded successfully, the a posteriori LLR values output from the FEC decoder are soft-remodulated (block 48) to output an a posteriori soft symbol. Soft-remodulating the a posteriori LLR values is carried out according to the modulation scheme used by the transmitter to modulate the encoded bits.

While it is possible to assume that the a posteriori values will be better than the a priori values and automatically store the a posteriori values in the HARQ memory, optionally one may prefer to compare the two in order to ensure that the a posteriori value is, indeed, the better value. In order to compare the similarity of the a-posteriori soft-symbols to the ideal modulation grid with that of the a-priori soft-symbols (i.e., the soft symbols extracted from the carrier wave), the variances of the a-posteriori soft symbols and the variances of the a-priori soft symbols are calculated (block 50). The variances are compared (block 52) and, if the variance of the a-posteriori soft-symbol is larger than that of the variance of the a-priori soft symbol (i.e., $\sigma^2_1 > \sigma^2_0$), it is assumed that the additional information added on the decoder output has improved the LLRs, and the a-posteriori LLR values of the a-posteriori soft-symbol are stored for future combining (block 54). On the other hand, if the variance of the a-posteriori soft symbol is smaller than that of the a-priori soft symbol (i.e., $\sigma^2_1 < \sigma^2_0$), it is assumed the LLR values output from the decoder are not converged towards the true codeword, and the a-priori LLR values are stored (block 56). Thus, the receiver has the ability to assess the degree of the improvement of the a-posteriori LLR values with respect to the a-priori LLR values of the same transmission, and decide, accordingly, which is the better of the two to store for further decoding, by combining this LLR value with the LLR values of the following retransmissions, and submitting the combined values to the FEC decoder.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A method for HARQ combining of a received codeword in a receiver with a FEC decoder, the method comprising:
   computing Log Likelihood Ratios (LLRs) of demodulated soft symbols of said received codeword and outputting said LLRs as a-priori soft bits;
   performing iterative decoding of said a-priori soft bits in a Forward Error Correction (FEC) decoder;
   outputting a-posteriori soft bits of said a-priori soft bits of said received codeword from said FEC decoder;
   selecting either said a-priori soft bits or said a-posteriori soft bits of said codeword for HARQ combining based on a comparison between a variance associated with said a-priori soft bits and a variance associated with said a-posteriori soft bits; and HARQ combining said selected soft bits with a retransmission of said received codeword.

2. The method according to claim 1, further comprising storing said selected soft bits in a HARQ memory before said HARQ combining.

3. The method according to claim 1, further comprising:
computing a variance ($\sigma^2_0$) of at least one demodulated a-priori soft symbol related to said a-priori soft-bits, wherein $\sigma^2_0$ comprises said variance associated with said a-priori soft bits; and
computing a variance ($\sigma^2_1$) of at least one a-posteriori soft symbol remodulated from said a-posteriori soft-bits, wherein $\sigma^2_1$ comprises said variance associated with said a-posteriori soft bits.

4. The method according to claim 1, wherein said HARQ combining is selected from one or both of Chase combining and Incremental Redundancy combining.

5. A receiver for a wireless telecommunication system, the receiver comprising:
an LLR computation and HARQ combining module configured to provide a-priori soft bits;
a FEC decoder coupled to said LLR computation and HARQ combining module, said FEC decoder configured to receive said a-priori soft bits and output a-posteriori soft bits corresponding to said a-priori soft bits;
a compare and select module configured to select either said a-priori soft bits or said a-posteriori soft bits of said codeword for HARQ combining based on a comparison between a variance associated with said a-priori soft bits and a variance associated with said a-posteriori soft bits; and
a HARQ memory coupled to said FEC decoder, said HARQ memory configured to receive and store said selected soft bits;
said HARQ memory being coupled to said LLR computation and HARQ combining module and configured to provide said selected soft bits to said LLR computation and HARQ combining module.

6. The method according to claim 3, wherein said selecting comprises:
selecting said a-posteriori soft bits in response to a determination that $\sigma^2_1$ is greater than $\sigma^2_0$.

7. The method according to claim 3, wherein said selecting comprises:
selecting said a-priori soft bits in response to a determination that $\sigma^2_0$ is greater than $\sigma^2_1$.

8. The method according to claim 3, further comprising:
determining whether said iterative decoding of said a-priori soft bits was successful.

9. The method according to claim 8, further comprising:
soft-remodulating said a-posteriori soft bits to said at least one a-posteriori soft symbol in response to a determination that said decoding was unsuccessful.

10. The receiver according to claim 5, wherein said compare and select module is further configured to:
compute a variance ($\sigma^2_0$) of at least one demodulated a-priori soft symbol related to said a-priori soft-bits, wherein $\sigma^2_0$ comprises said variance associated with said a-priori soft bits; and
compute a variance ($\sigma^2_1$) of at least one a-posteriori soft symbol remodulated from said a-posteriori soft-bits, wherein $\sigma^2_1$ comprises said variance associated with said a-posteriori soft bits.

11. The receiver according to claim 10, wherein said compare and select module is further configured to:
select said a-posteriori soft bits in response to a determination that $\sigma^2_1$ is greater than $\sigma^2_0$.

12. The receiver according to claim 10, wherein said compare and select module is further configured to:
select said a-priori soft bits in response to a determination that $\sigma^2_0$ is greater than $\sigma^2_1$.

13. The receiver according to claim 10, wherein said compare and select module is further configured to:
determine whether said iterative decoding of said a-priori soft bits was successful.

14. The receiver according to claim 13, wherein said compare and select module is further configured to:
soft-remodulate said a-posteriori soft bits into said at least one a-posteriori soft symbol in response to a determination that said decoding was unsuccessful.

15. The receiver according to claim 5, wherein said LLR computation and HARQ combining module is configured to perform HARQ combining selected from one or both of Chase combining or Incremental Redundancy combining.

16. An apparatus for HARQ combining of a received codeword, said apparatus comprising:
means for computing Log Likelihood Ratios (LLRs) of demodulated soft symbols of said received codeword and outputting said LLRs as a-priori soft bits;
means for performing iterative decoding of said a-priori soft bits in a Forward Error Correction (FEC) decoder;
means for outputting a-posteriori soft bits of said a-priori soft bits of said received codeword from said FEC decoder;
means for selecting either said a-priori soft bits or said a-posteriori soft bits of said codeword for HARQ combining based on a comparison between a variance associated with said a-priori soft bits and a variance associated with said a-posteriori soft bits; and
means for HARQ combining said selected soft bits with a retransmission of said received codeword.

17. The apparatus according to claim 16, further comprising:
means for storing said selected soft bits in a HARQ memory before said HARQ combining.

18. The apparatus according to claim 16, further comprising:
means for computing a variance ($\sigma^2_0$) of at least one demodulated a-priori soft symbol related to said a-priori soft-bits, wherein $\sigma^2_0$ comprises said variance associated with said a-priori soft bits; and
means for computing a variance ($\sigma^2_1$) of at least one a-posteriori soft symbol remodulated from said a-posteriori soft-bits, wherein $\sigma^2_1$ comprises said variance associated with said a-posteriori soft bits.

19. The apparatus of claim 18, wherein said means for selecting comprises:
means for selecting said a-posteriori soft bits in response to a determination that $\sigma^2_1$ is greater than $\sigma^2_0$.

20. The apparatus of claim 18, wherein said means for selecting comprises:
means for selecting said a-priori soft bits in response to a determination that $\sigma^2_0$ is greater than $\sigma^2_1$.

21. The apparatus of claim 18, further comprising:
means for determining whether said iterative decoding of said a-priori soft bits was successful.

22. The apparatus of claim 21, further comprising:
means for soft-remodulating said a-posteriori soft bits to said at least one a-posteriori soft symbol in response to a determination that said decoding was unsuccessful.

23. The apparatus of claim 16, wherein said HARQ combining is selected from one or both of Chase combining or Incremental Redundancy combining.

* * * * *